United States Patent
Cheung et al.

(10) Patent No.: US 10,514,169 B2
(45) Date of Patent: Dec. 24, 2019

(54) COMBUSTOR HOLE ARRANGEMENT FOR GAS TURBINE ENGINE

(71) Applicant: United Technologies Corporation, Farmington, CT (US)

(72) Inventors: Albert K. Cheung, East Hampton, CT (US); Christos Adamopoulos, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 781 days.

(21) Appl. No.: 14/826,463

(22) Filed: Aug. 14, 2015

(65) Prior Publication Data

US 2017/0045226 A1 Feb. 16, 2017

(51) Int. Cl.
*F23R 3/06* (2006.01)
*F23R 3/00* (2006.01)
*F23R 3/50* (2006.01)

(52) U.S. Cl.
CPC ............. *F23R 3/002* (2013.01); *F23R 3/06* (2013.01); *F23R 3/50* (2013.01)

(58) Field of Classification Search
CPC .... F23R 3/002; F23R 3/04; F23R 3/06; F23R 3/10; F23R 3/50; F23R 2900/00018; F23R 2900/00019; F23R 2900/03041; F23R 2900/03042; F23R 2900/03043; F23R 2900/03044; F23R 2900/03045
See application file for complete search history.

(56) References Cited

U.S. PATENT DOCUMENTS

| | | | | |
|---|---|---|---|---|
| 2,543,755 A * | 3/1951 | Berger | ...................... | F23R 3/06 60/752 |
| 3,430,934 A * | 3/1969 | Weishaupt | ............... | B01J 19/30 261/94 |
| 4,733,538 A * | 3/1988 | Vdoviak | ................. | F01D 9/023 60/752 |
| 5,642,621 A * | 7/1997 | Alary | ........................ | F23R 3/10 60/747 |
| 6,260,359 B1 * | 7/2001 | Monty | ...................... | F23R 3/06 60/732 |
| 7,887,100 B1 * | 2/2011 | Paolone | .................. | F01N 13/18 285/124.3 |
| 8,099,961 B2 * | 1/2012 | Gerendas | ................ | F23R 3/002 60/752 |

(Continued)

FOREIGN PATENT DOCUMENTS

EP 1632720 A1 3/2006
WO 2010081941 A1 7/2010

(Continued)

OTHER PUBLICATIONS

European Search Report and Communication; Application No. 29.13.129931; dated Jan. 13, 2017; 8 pages.

Primary Examiner — William H Rodriguez
(74) *Attorney, Agent, or Firm* — Cantor Colburn LLP

(57) ABSTRACT

A combustor liner for a gas turbine is provided. The combustor liner comprises a wall and a plurality of airflow injection holes in the wall arranged in a circumferentially-extending row, the plurality of airflow injection holes including a plurality of circular first airflow injection holes and at least one non-circular second airflow injection hole.

13 Claims, 6 Drawing Sheets

(56) References Cited

U.S. PATENT DOCUMENTS

| | | | |
|---|---|---|---|
| 2004/0083735 A1* | 5/2004 | Borns | F23R 3/10 60/772 |
| 2007/0084219 A1* | 4/2007 | Bernier | F23R 3/002 60/804 |
| 2008/0010992 A1* | 1/2008 | Patterson | F23R 3/06 60/772 |
| 2008/0127651 A1* | 6/2008 | Zupanc | F23R 3/06 60/752 |
| 2010/0011773 A1* | 1/2010 | Suleiman | F23R 3/06 60/752 |
| 2010/0077763 A1* | 4/2010 | Alkabie | F23R 3/06 60/754 |
| 2010/0218503 A1* | 9/2010 | Bronson | F23R 3/06 60/754 |
| 2011/0271678 A1 | 11/2011 | Snecma | |
| 2012/0137697 A1* | 6/2012 | Sandelis | F23R 3/06 60/752 |
| 2012/0291442 A1* | 11/2012 | Commaret | F23R 3/06 60/746 |
| 2014/0216044 A1* | 8/2014 | Erbas-Sen | F23R 3/002 60/772 |
| 2015/0369487 A1* | 12/2015 | Dierberger | F01D 25/12 60/772 |

FOREIGN PATENT DOCUMENTS

| | | |
|---|---|---|
| WO | 2012114030 A1 | 8/2012 |
| WO | 2014149081 A1 | 9/2014 |

* cited by examiner

COMBUSTOR HOLE ARRANGEMENT FOR GAS TURBINE ENGINE

BACKGROUND

This disclosure relates to gas turbine engines, and more particularly to combustor airflow hole arrangements for gas turbine engines.

Combustor air exit temperature is a significant driver of gas turbine engine performance and design. Components downstream of the combustor, such as the turbine and turbine blades, are configured for use with particular temperature ranges. Spacing and arrangement of airflow holes in the combustor are a key driver of combustor exit temperature. Sufficient airflow must reach the combustion chamber of the combustor through these airflow holes, thus reducing the temperature of combustion gases to a desired temperature range. The airflow holes, however, must also be arranged to allow for cooling airflow to flow across the combustor itself, to cool the combustor and extend the combustor service life.

SUMMARY

According to one embodiment, a combustor liner for a gas turbine is provided. The combustor liner comprises a wall and a plurality of airflow injection holes in the wall arranged in a circumferentially-extending row, the plurality of airflow injection holes including a plurality of circular first airflow injection holes and at least one non-circular second airflow injection hole.

In addition to one or more of the features described above, or as an alternative, further embodiments may include that the plurality of airflow injection holes is an alternating arrangement of first airflow injection holes and second airflow injection holes.

In addition to one or more of the features described above, or as an alternative, further embodiments may include that the second airflow injection hole has an aspect ratio of axial length to circumferential width of greater than or equal to two.

In addition to one or more of the features described above, or as an alternative, further embodiments may include that the aspect ratio is between two and six.

In addition to one or more of the features described above, or as an alternative, further embodiments may include that the second airflow injection hole is one of elliptically-shaped, diamond-shaped or oval-shaped.

In addition to one or more of the features described above, or as an alternative, further embodiments may include that a ratio of a material width between adjacent first airflow injection holes and second airflow injection holes to a radius of the wall is greater than or equal to 0.030.

In addition to one or more of the features described above, or as an alternative, further embodiments may include that a ratio of first airflow injection hole diameter and second airflow injection hole circumferential width is between 3 and 12.

According to another embodiment, a combustor for a gas turbine engine includes a combustor case and a combustor liner disposed in the combustor case, radially offset from the combustor case to define an airflow pathway between the combustor case and the combustor liner. The combustor liner includes a wall and a plurality of airflow injection holes in the wall arranged in a circumferentially-extending row, the plurality of airflow injection holes including a plurality of circular first airflow injection holes and at least one non-circular second airflow injection hole, the plurality of airflow injection holes configured to reduce a temperature of combustion gases exiting the combustor.

In addition to one or more of the features described above, or as an alternative, further embodiments may include one or more fuel injectors extending through the combustor liner and into the combustion zone, providing a flow of fuel for combustion in the combustion zone.

In addition to one or more of the features described above, or as an alternative, further embodiments may include that the plurality of airflow injection holes is an alternating arrangement of first airflow injection holes and second airflow injection holes.

In addition to one or more of the features described above, or as an alternative, further embodiments may include that the second airflow injection hole has an aspect ratio of axial length to circumferential width of greater than or equal to two.

In addition to one or more of the features described above, or as an alternative, further embodiments may include that the aspect ratio is between two and six.

In addition to one or more of the features described above, or as an alternative, further embodiments may include that the second airflow injection hole is one of elliptically-shaped, diamond-shaped or oval-shaped.

In addition to one or more of the features described above, or as an alternative, further embodiments may include that a ratio of a material width between adjacent first airflow injection holes and second airflow injection holes to a radius of the wall is greater than or equal to 0.030.

In addition to one or more of the features described above, or as an alternative, further embodiments may include that a ratio of first airflow injection hole diameter and second airflow injection hole circumferential width is between 3 and 12.

According to another embodiment, a gas turbine engine is provided. The gas turbine engine includes a turbine and a combustor operably connected to the turbine, the combustor driving the turbine via combustion products of the combustor. The combustor includes a combustor case and a combustor liner disposed in the combustor case, radially offset from the combustor case to define an airflow pathway between the combustor case and the combustor liner. The combustor liner includes a wall and the wall including a plurality of airflow injection holes arranged in a circumferentially-extending row, the plurality of airflow injection holes including a plurality of circular first airflow injection holes and at least one non-circular second airflow injection hole, the plurality of airflow injection holes configured to reduce a temperature of combustion gases exiting the combustor.

In addition to one or more of the features described above, or as an alternative, further embodiments may include one or more fuel injectors extending through the combustor liner and into the combustion zone, providing a flow of fuel for combustion in the combustion zone.

In addition to one or more of the features described above, or as an alternative, further embodiments may include that the plurality of airflow injection holes is an alternating arrangement of first airflow injection holes and second airflow injection holes.

In addition to one or more of the features described above, or as an alternative, further embodiments may include that the second airflow injection hole has an aspect ratio of axial length to circumferential width of greater than or equal to two.

In addition to one or more of the features described above, or as an alternative, further embodiments may include that the aspect ratio is between two and six.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
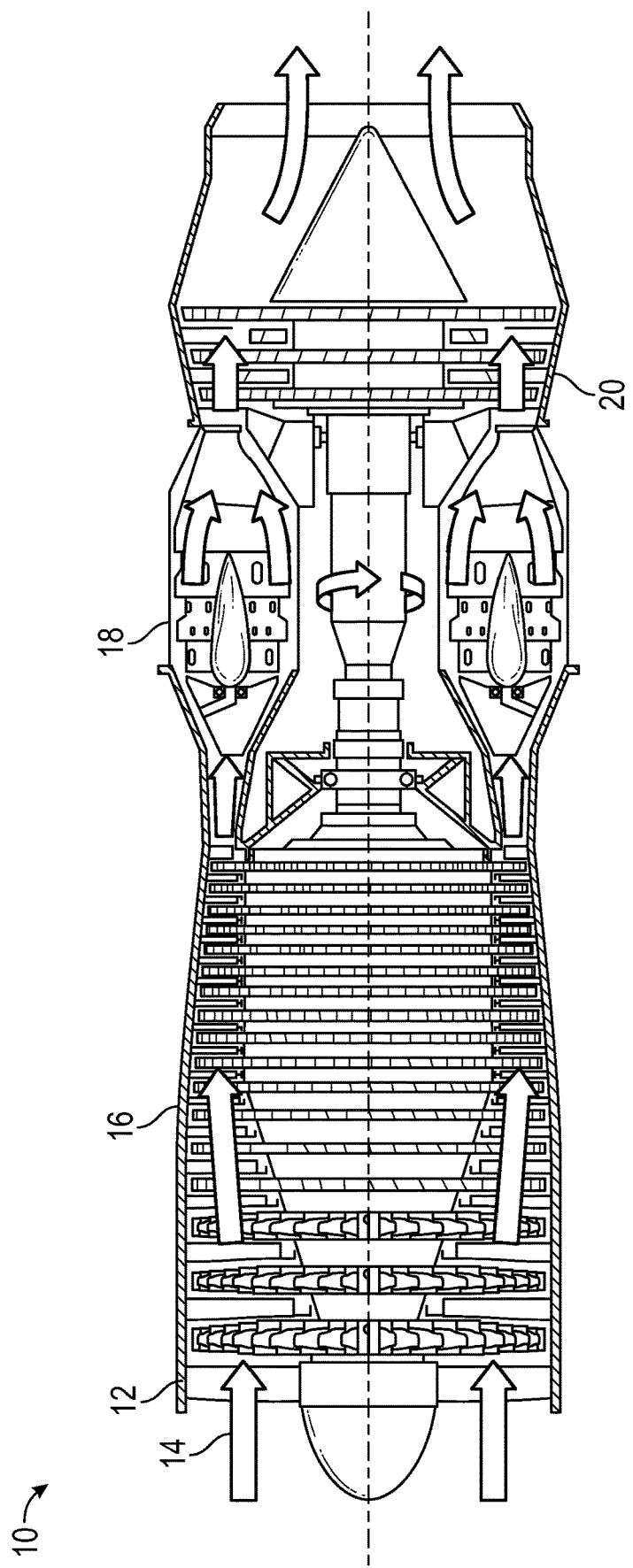
FIG. 1 is a schematic illustration of a gas turbine engine.

FIG. 1 is a schematic illustration of an exemplary gas turbine engine 10 capable of using features of the present disclosure. While a turbojet gas turbine engine 10 is illustrated, it is to be appreciated that the present disclosure may be utilized with other gas turbine engine configurations such as, but not limited to, turbo prop, turbo fan (geared or conventional), or industrial gas turbine engines. The gas turbine engine 10 generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10.

The gas turbine engine 10 may further comprise a low pressure compressor located in front of a high pressure compressor and a high pressure turbine located in front of a low pressure turbine. For example, the compressor 16 may be a multi-stage compressor 16 that has a low-pressure compressor and a high-pressure compressor and the turbine 20 may be a multistage turbine 20 that has a high-pressure turbine and a low-pressure turbine. In one embodiment, the low-pressure compressor is connected to the low-pressure turbine and the high pressure compressor is connected to the high-pressure turbine. In some embodiments, a gear arrangement (not shown) connects the fan 12 and compressor 16 so the fan 12 and compressor 16 to allow for the fan 12 and compressor 16 to have different rotational speeds.

Figure 2:
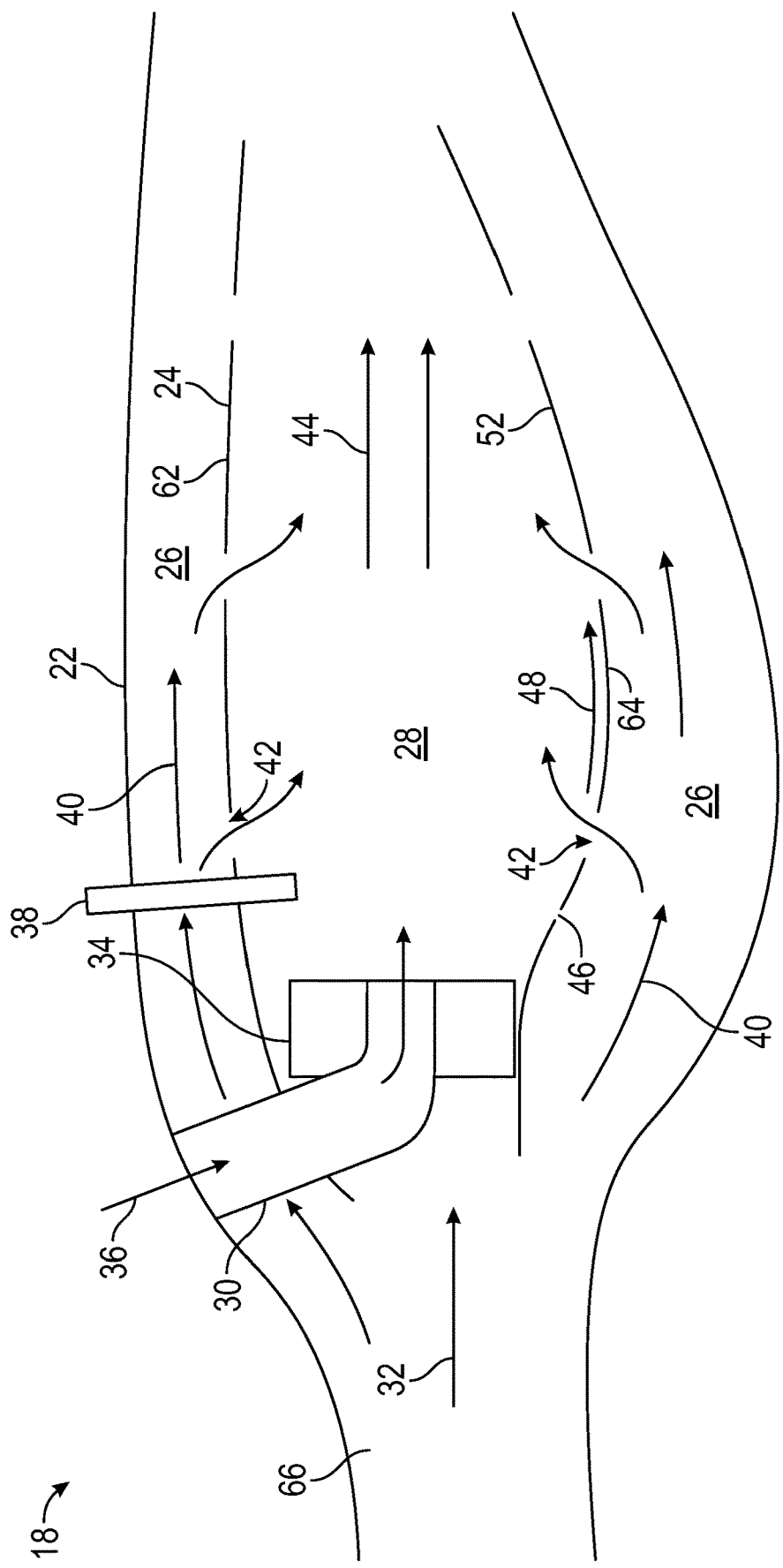
FIG. 2 is a schematic view of combustor airflow in a gas turbine engine.

Shown in FIG. 2 is a schematic view of an exemplary combustor 18. The combustor 18 can have an annular structure including a combustor case 22 that houses a combustor liner 24. The combustor liner 24 is offset from the combustor case 22 to define an outer airflow path 26 between the combustor liner 24 and the combustor case 22. While and annular combustor 18 is illustrated, one skilled in the art will appreciate that the present disclosure may be applicable to other combustor configurations, such as can-annular combustors. The combustor liner 24 comprises an axially-extending outer wall 62 and an axially extending inner wall 64 that each extend circumferentially around the combustor 18. A radial offset between the outer wall 62 and the inner wall 64 defines a combustion zone 28 inside of the combustor liner 24 where a fuel and air mixture is combusted. A fuel flow 36 is delivered to the combustion zone 28 via one or more fuel injectors 30, while a primary airflow 32 is delivered to the combustion zone 28 through, for example, a swirler 34, which enhances mixing of the primary airflow 32 and the fuel flow 36 prior to combustion. An igniter 38 may be utilized to initiate combustion in the combustion zone 28. While a single combustion zone 28 is shown in FIG. 2, it is to be appreciated that multiple combustion zones 28 may be arranged circumferentially around the combustor 18.

The primary airflow 32 is received at the combustor 18 from the compressor via a diffuser 66. Primary airflow 32 not flowed into the combustion zone 28 via the swirler 34 may be diverted into the outer airflow path 26 as a secondary airflow 40. The combustor liner 24 includes a plurality of airflow injection holes 42. Via the airflow injection holes 42, secondary airflow 40 is directed into the combustion zone 28 to mix with combustion gases 44 as the combustion gases 44 flow toward the turbine 20. Since the secondary airflow 40 is lower in temperature than combustion gases 44 in the combustion zone 28, the addition of the secondary airflow 40 to the combustion gases 44 reduces the temperature of the combustion gases 44 to a selected temperature or selected temperature range. The degree of temperature reduction depends, at least in part, on the volume of secondary airflow 40 mixed with the combustion gases 44. The secondary airflow 40 volume, in turn, depends on a total open area of the airflow injection holes 42.

In addition to the airflow injection holes 42, in some embodiments the combustor liner 24 additionally includes cooling flow holes 46. The cooling flow holes 46 are generally smaller in open area than the airflow injection holes 42 and direct a cooling airflow 48 from the outer airflow path 26 through the combustor liner 24. The cooling airflow 48 forms a cooling film on an inner liner surface 52, as well as other liner surfaces, such as an outer diameter and bulkhead, to cool the combustor liner 24 and protect the combustor liner 24 from the extreme high temperature of the combustion gases 44. Thus, the airflow injection holes 42 should be configured and arranged to support formation of the cooling film.

Figure 3:
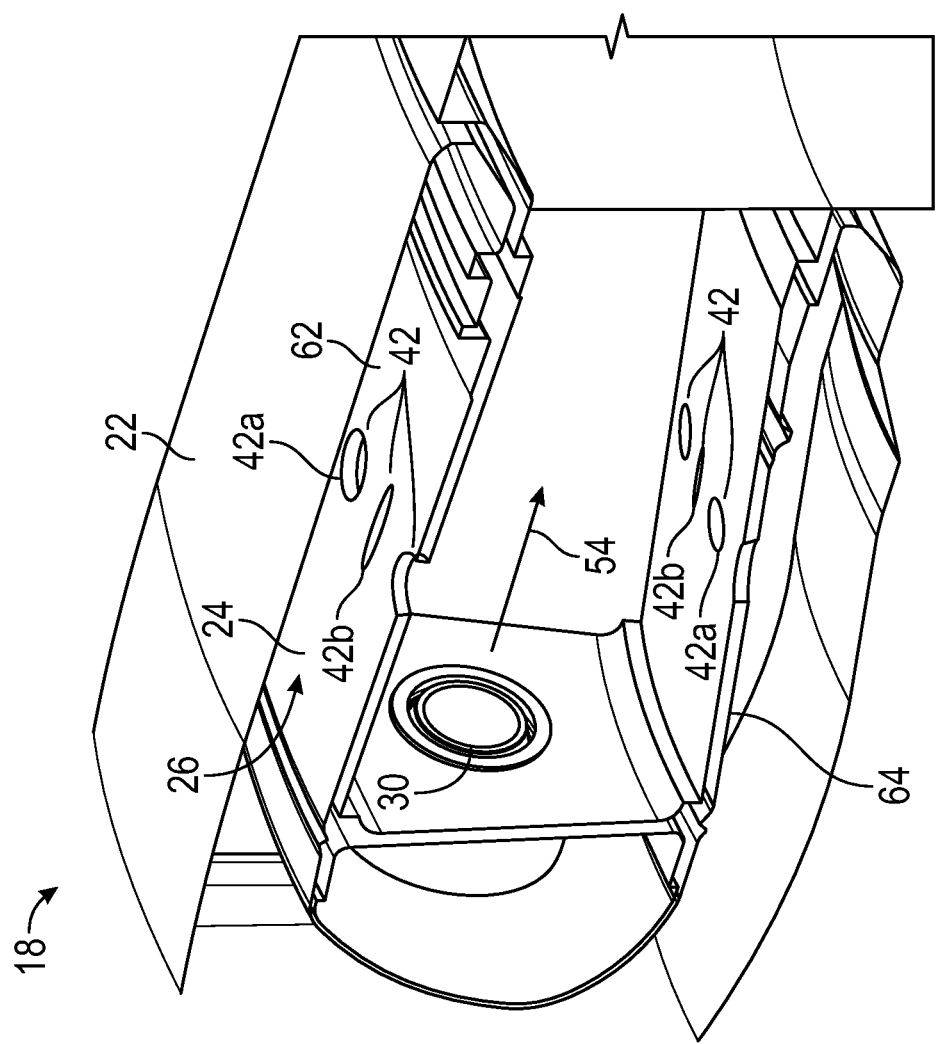
FIG. 3 is a partial perspective cross-sectional view of an embodiment of a combustor for a gas turbine engine.
Figure 4:
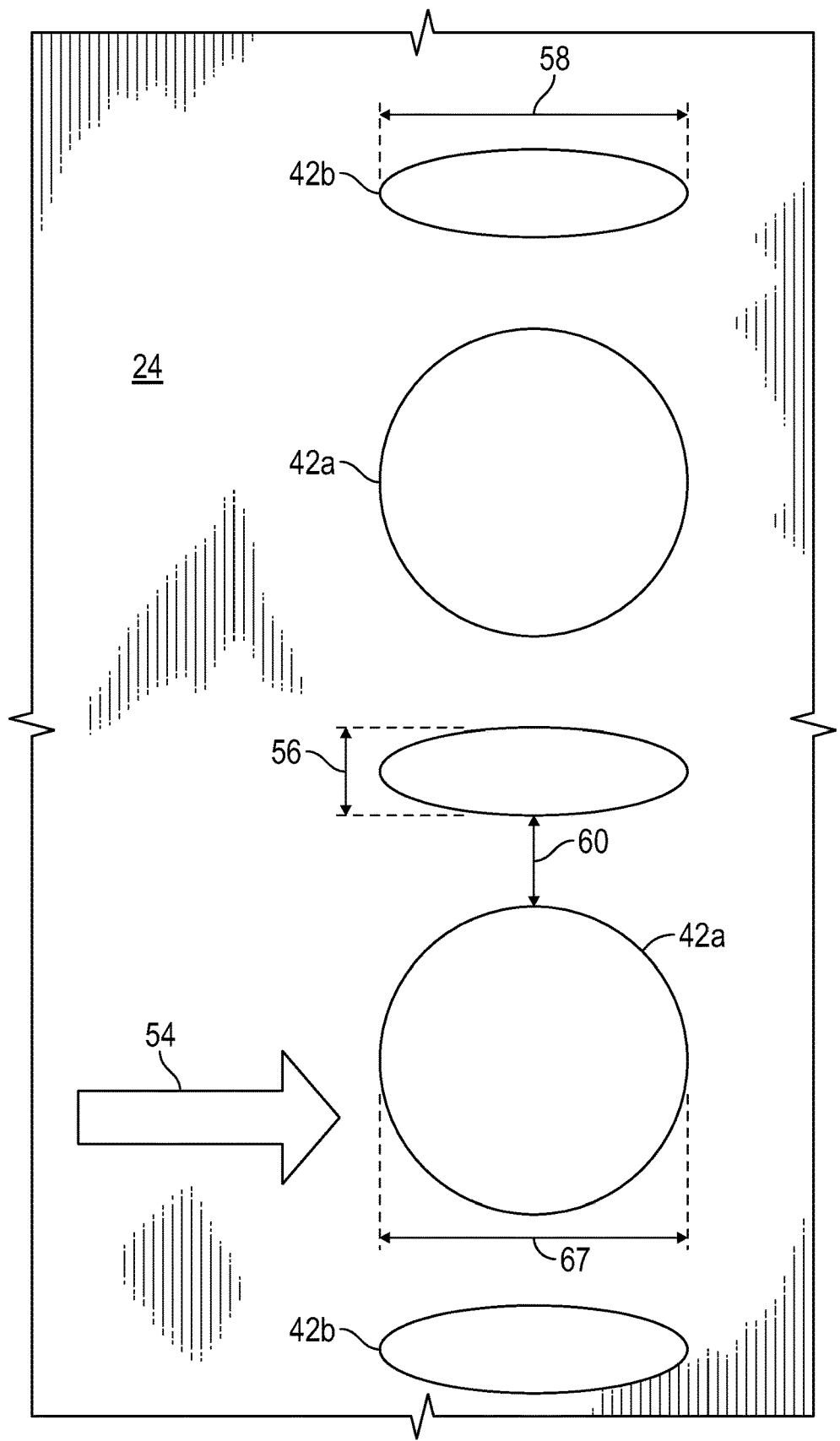
FIG. 4 is a view of an airflow hole arrangement for a combustor of a gas turbine engine.

Referring to FIGS. 3 and 4, one embodiment of a combustor liner 24 is illustrated. The combustor liner 24 includes the plurality of airflow injection holes 42 and the plurality of cooling flow holes 46. The airflow injection holes 42 are arranged in axially-spaced rows extending circumferentially around the combustor liner 24. Each row of airflow injection holes 42 includes airflow injection holes 42 of at least two different perimetrical shapes. For example, as shown, the row includes an alternating arrangement of circular airflow injection holes 42a and axially-elongated airflow injection holes 42b, the axially-elongated airflow injection holes 42b elongated along a general airflow direction 54 through the combustor 18. In some embodiments, the circular airflow injection holes 42a may be offset in a streamwise direction from the axially-elongated airflow injection holes 42b.

Figure 5:
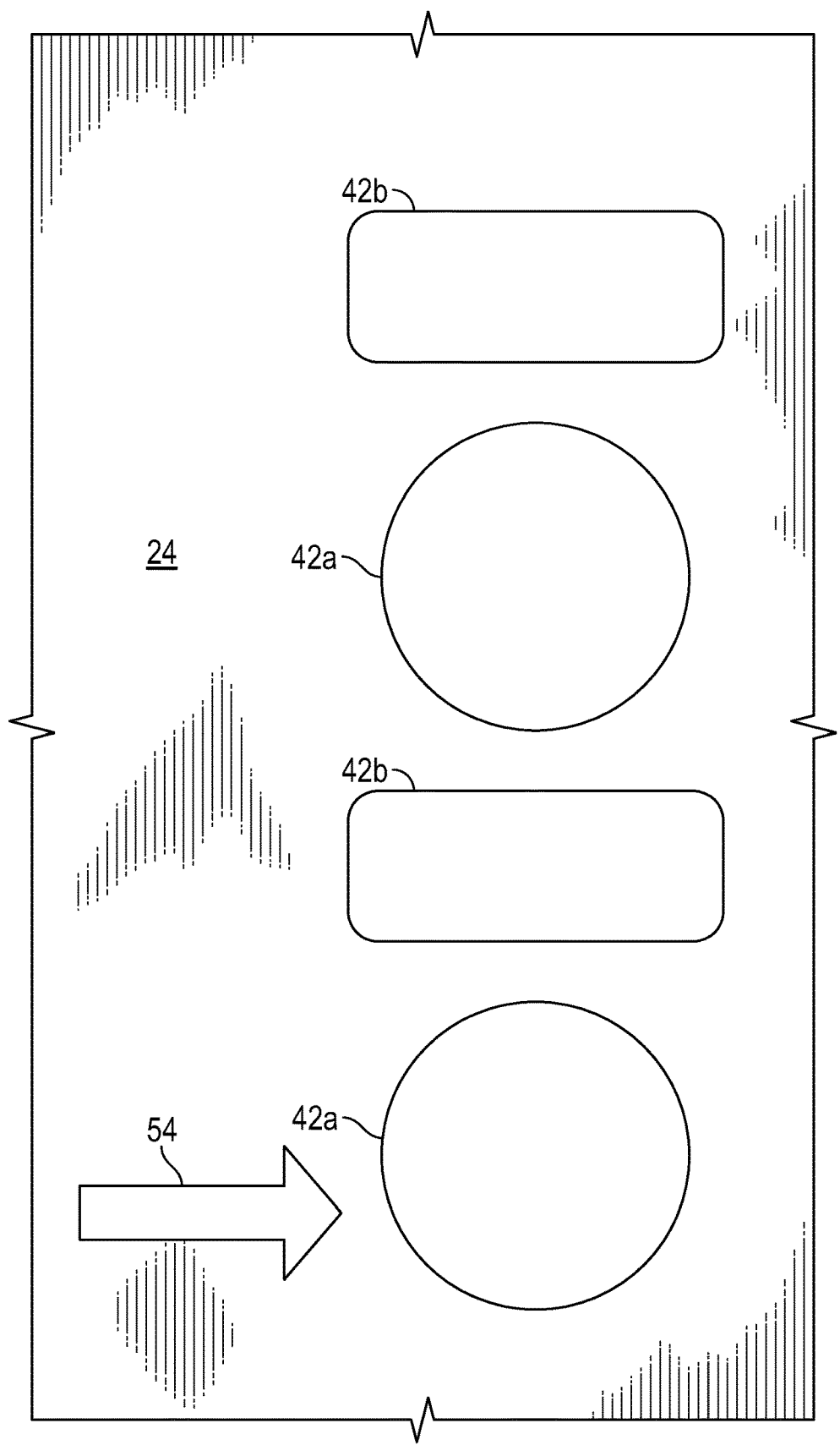
FIG. 5 is a view of another airflow hole arrangement for a combustor of a gas turbine engine.
Figure 6:
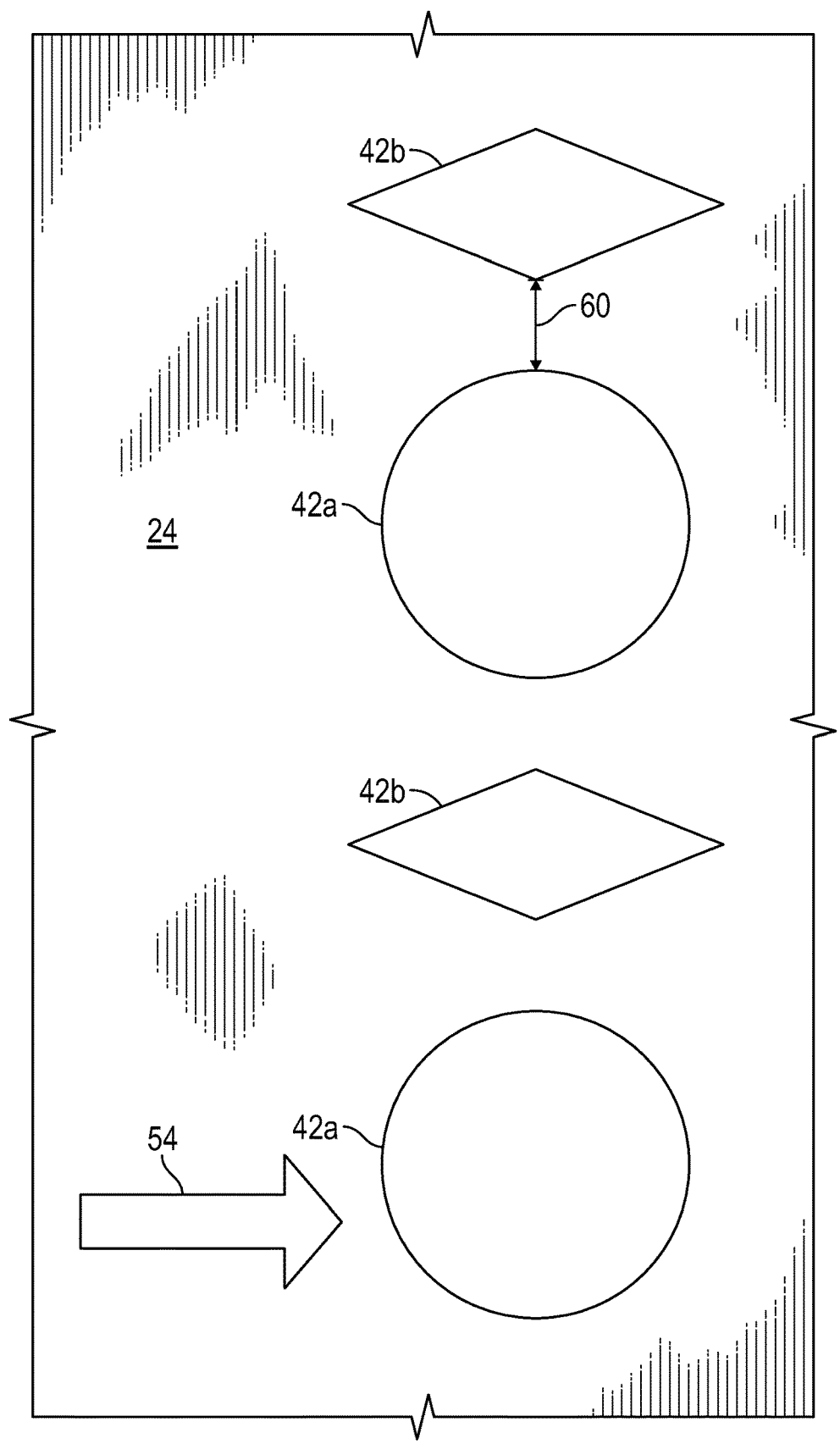
FIG. 6 is a view of yet another airflow hole arrangement for a combustor of a gas turbine engine.

In some embodiments, the axially-elongated airflow injection holes 42b are elliptical (shown in FIG. 4), while in other embodiments other shapes such as oval (shown in FIG. 5), diamond-shaped (shown in FIG. 6), rectangular, or other shape may be utilized. The axially-elongated airflow injection holes 42b have a circumferential width 56 and an axial length 58 greater than the circumferential width 56. In some embodiments, an aspect ratio of axial length 58 to circumferential width 56 is between 2 and 6. The axially-elongated airflow injection holes 42b are configured to allow a secondary airflow 40 through each axially-elongated airflow injection hole 42b substantially equal to the secondary airflow 40 through each circular airflow injection hole 42a. In some embodiments, an area of each axially-elongated airflow injection hole 42b is equal to an area of each circular airflow injection hole 42a.

The arrangement of alternating circular and elongated airflow injection holes 42 increases a material width 60 between the airflow injection holes 42, compared to arrangements with large circular holes alternating with small circular holes. That is, the amount of material (material width 60) between two adjacent injection holes may be increased as comparted to having only circular holes. The increased material width 60 increases a surface area of the inner liner surface 52 to better support formation of a cooling film. Thus, configurations as disclosed herein are able to meet secondary airflow 40 requirements to achieve a selected temperature of combustion gases directed to the turbine 20, while achieving successful cooling of the combustor liner 24. As such, service life of turbine 20 components and the combustor liner 24 can be increased. In order to meet exit temperature quality requirements, it may be desirable to have the cooling airflow material width 60 close to minimize gaps through which combustion gases from the primary zone (front end) of the combustor 18 can escape without diluting with the air from the airflow injection holes 42. While having large circular holes alternating with small circular holes would accomplish this, it would impact the combustor life because there is no space left in between the large and small airflow injection holes when accounting for panel grommets to put cooling holes in the combustor liner. To meet both requirements (exit temperature quality and combustor life) the spacing between the airflow injection holes 42 needs to be minimized and enough room needs to be left to put cooling holes in the liner. Thus a configuration which alternates axially-elongated airflow injection holes 42b with circular airflow injection holes 42a allows for both requirements to be met. In some non-limiting embodiments, a ratio of the material width 60, i.e., the width or distance of material between two adjacent injection holes 42a, 42b, to the radius of the liner wall (62, 64) may be 0.030 or greater. A ratio of the circular hole diameter 66 to elongated hole circumferential width 56 may be between 3 and 12.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A combustor liner for a gas turbine comprising:
a wall; and
a plurality of airflow injection holes in the wall arranged in a circumferentially-extending row, the plurality of airflow injection holes including a plurality of circular first airflow injection holes and at least one non-circular second airflow injection hole, each circular first airflow injection hole having a first area equal to a second area of each non-circular second airflow injection hole;
wherein the plurality of airflow injection holes is an alternating arrangement of first airflow injection holes and second airflow injection holes, such that a first airflow injection hole is adjacent to a second airflow injection hole in each circumferential direction along the circumferentially-extending row and a second airflow injection hole is adjacent to a first airflow injection hole in each circumferential direction along the circumferentially-extending row.

2. The combustor liner of claim 1, wherein the second airflow injection hole has an axial length greater than a circumferential width of the second airflow injection hole.

3. The combustor liner of claim 2, wherein an aspect ratio of the axial length to the circumferential width is between two and six.

4. The combustor liner of claim 1, wherein the second airflow injection hole is one of elliptically-shaped, diamond-shaped or oval-shaped.

5. The combustor liner of claim 1 wherein a ratio of first airflow injection hole diameter and second airflow injection hole circumferential width is between 3 and 12.

6. A combustor for a gas turbine engine comprising:
a combustor case; and
a combustor liner disposed in the combustor case, radially offset from the combustor case to define an airflow pathway between the combustor case and the combustor liner, the combustor liner including:
a wall; and
a plurality of airflow injection holes in the wall arranged in a circumferentially-extending row, the plurality of airflow injection holes including a plurality of circular first airflow injection holes and at least one non-circular second airflow injection hole, the plurality of airflow injection holes configured to reduce a temperature of combustion gases exiting the combustor, each circular first airflow injection hole having a first area equal to a second area of each non-circular second airflow injection hole;
wherein the plurality of airflow injection holes is an alternating arrangement of first airflow injection holes and second airflow injection holes, such that a first airflow injection hole is adjacent to a second airflow injection hole in each circumferential direction along the circumferentially-extending row and a second airflow injection hole is adjacent to a first airflow injection hole in each circumferential direction along the circumferentially-extending row.

7. The combustor of claim 6, further comprising one or more fuel injectors extending through the combustor liner and into the combustion zone, providing a flow of fuel for combustion in the combustion zone.

8. The combustor of claim 6, wherein the second airflow injection hole has an aspect ratio of axial length to circumferential width of between two and six.

9. The combustor of claim 6, wherein the second airflow injection hole is one of elliptically-shaped, diamond-shaped or oval-shaped.

10. The combustor of claim 6 wherein a ratio of first airflow injection hole diameter and second airflow injection hole circumferential width is between 3 and 12.

11. A gas turbine engine comprising:
a turbine; and
a combustor operably connected to the turbine, the combustor driving the turbine via combustion products of the combustor, the combustor including:
a combustor case; and
a combustor liner disposed in the combustor case, radially offset from the combustor case to define an airflow pathway between the combustor case and the combustor liner, the combustor liner including:
a wall; and
the wall including a plurality of airflow injection holes arranged in a circumferentially-extending row, the plurality of airflow injection holes including a plurality of circular first airflow injection holes and at least one non-circular second airflow injection hole, the plurality of airflow injection holes configured to reduce a temperature of combustion gases exiting the combustor, each circular first airflow injection hole having a first area equal to a second area of each non-circular second airflow injection hole;
wherein the plurality of airflow injection holes is an alternating arrangement of first airflow injection holes and second airflow injection holes, such that a first airflow injection hole is adjacent to a second airflow injection hole in each circumferential direction along the circumferentially-extending row and a second airflow injection hole is adjacent to a first airflow injection hole in each circumferential direction along the circumferentially-extending row.

12. The gas turbine engine of claim 11, further comprising one or more fuel injectors extending through the combustor liner and into the combustion zone, providing a flow of fuel for combustion in the combustion zone.

13. The gas turbine engine of claim 11, wherein the second airflow injection hole has an aspect ratio of axial length to circumferential width of between two and six.

* * * * *